United States Patent [19]

Ishikawa et al.

[11] Patent Number: 5,048,332
[45] Date of Patent: Sep. 17, 1991

[54] FLOW METER FOR MEASURING FLUID FLOW WITH MULTIPLE TEMPERATURE SENSORS

[75] Inventors: Kouichi Ishikawa; Hiroshi Mihira; Noriyuki Kimura; Masao Yamaguchi, all of Kyoto, Japan

[73] Assignee: Stec Inc., Kyoto, Japan

[21] Appl. No.: 461,238

[22] Filed: Jan. 5, 1990

Related U.S. Application Data

[62] Division of Ser. No. 337,926, Apr. 14, 1989, Pat. No. 4,947,889.

[30] Foreign Application Priority Data

Nov. 22, 1988 [JP] Japan ................... 63-295261

[51] Int. Cl.$^5$ ............................................. G01F 1/68
[52] U.S. Cl. ............................... 73/204.16; 73/204.24
[58] Field of Search ........... 73/204.16, 204.18, 204.19, 73/204.23, 204.24, 204.25, 204.27, 204.22

[56] References Cited

U.S. PATENT DOCUMENTS

| | | | |
|---|---|---|---|
| 2,729,976 | 1/1956 | Laub ................................. | 73/204.16 |
| 3,142,170 | 7/1964 | Calhoun . | |
| 3,336,804 | 8/1967 | Poppendier et al. ............. | 73/204.24 |
| 4,016,759 | 4/1977 | Baker et al. . | |
| 4,135,396 | 1/1979 | Stanke et al. ..................... | 73/204.19 |
| 4,339,949 | 7/1982 | Bahner et al. ..................... | 73/204.27 |
| 4,384,578 | 5/1983 | Winkler ............................. | 73/204.22 |
| 4,487,213 | 12/1984 | Gates et al. . | |
| 4,679,585 | 7/1987 | Ewing . | |
| 4,685,331 | 8/1987 | Renken et al. . | |
| 4,831,876 | 5/1989 | Porth et al. . | |

FOREIGN PATENT DOCUMENTS 1127568  9/1968  United Kingdom ............. 73/204.24

Primary Examiner—Herbert Goldstein
Attorney, Agent, or Firm—Joseph W. Price

[57] ABSTRACT

A part of a tube, through which a fluid passes, is cooled by means of an electronic cooling element and a flow rate of the fluid is measured on the basis of a temperature of a surface of the tube cooled. Not only can the flow rate of the liquid flowing through the tube be determined in a noncontacting manner and a very small flow rate of the liquid be determined, but also the tube is cooled so that no bubbles are generated, and thus the measurement of the liquid, which is apt to generate gases, such as low boiling point liquid, is possible. In addition, the measurement is not influenced by the gases dissolved in the liquid and merely the temperature difference resulting from the flow of the fluid, that is, the rise of the temperature of the fluid, is detected to prevent the measurement from being influenced by the installing posture of the flow meter, so that a highly accurate measurement is possible. Consequently, stable and sure controlling flow rate of liquid is possible.

6 Claims, 3 Drawing Sheets

FLOW METER FOR MEASURING FLUID FLOW WITH MULTIPLE TEMPERATURE SENSORS

This is a division of application Ser. No. 337,926, filed Apr. 14, 1989, now U.S. Pat. No. 4,947,889.

BACKGROUND OF THE INVENTION

1. Field of the Invention

The present invention generally relates to a method of measuring a flow rate of a fluid, such as liquid and gas and, in particular, to a method suitable for measuring a very small flow rate of a liquid and a flow meter for use in such method, as well as an apparatus for controlling a flow rate for use in a liquid using such flow meter.

2. Description of Related Art

Methods for measuring a very small flow rate of, for example, a liquid have included:

(1) a method in which a liquid is introduced into a vessel for an appointed time and a flow rate is determined on the basis of the weight of the liquid;

(2) a method in which a flow rate is determined on the basis of a time for filling up a liquid in a vessel having a known volume;

(3) a method using a rotor wheel and the like;

(4) a method in which a thermal sensor or a pressure sensor is disposed in a passage and a flow rate is determined from a velocity of flow; and (5) a method in which a heater is wound around a tube, through which a liquid passes, and a flow rate is determined on the basis of a temperature of the heater itself, and the flow before and after the heater.

However, the above-described respective methods have the following disadvantages.

(1) and (2) cannot carry out the measurement in line nor the instantaneous flow rate. (3) is difficult to measure a very small flow rate due to the size of the rotor wheel and the like. (4) has problems in shielding a sensor portion and the material of a liquid junction portion. In addition, (5) has a problem in the sensitivity of measurement and generates bubbles when the liquid is heated by means of the heater and, furthermore, is unsuitable for the measurement of low-boiling point liquids.

The present invention has been achieved in view of the above-described matters, and it is an object of the present invention to provide a method, a flow meter, and an apparatus having a high accuracy of measurement from which the above-described disadvantages have sought to be eliminated.

SUMMARY OF THE INVENTION

In order to achieve the above-described objects, a method of measuring a flow rate according to the present invention is characterized by a part of a tube, through which a fluid passes, being cooled by means of an electronic cooling element, and a flow rate of the fluid is measured on the basis of a temperature of a surface of the cooled tube.

A flow meter according to the present invention is characterized by a part of a tube, through which a fluid passes, being adapted to be cooled by means of an electronic cooling element, a first temperature-detecting element being mounted on a surface of the tube in the upper reaches of the cooled portion of the tube, a second temperature-detecting element being mounted on a surface of the electronic cooling element, a third temperature-detecting element being mounted on the cooled surface of the tube, and a flow rate of the fluid passing through the tube being measured on the basis of a difference between a temperature detected by the third temperature-detecting element and a temperature detected by the second temperature-detecting element. The electronic cooling element is controlled so that a difference between a temperature detected by the first temperature-detecting element and that detected by the second temperature-detecting element may amount to an appointed value.

Furthermore, an apparatus for controlling the flow rate of liquid according to the present invention comprises a liquid tank, means for sending the liquid out from the liquid tank, a flow meter disposed in a passage from the liquid tank, and a valve disposed on a downstream side of the flow meter. The flow meter is adapted to cool a part of a tube, through which the liquid passes, by means of an electronic cooling element. A first temperature-detecting element is mounted on a surface of the tube in the upper reaches of the cooled portion of the tube; a second temperature-detecting element is mounted on a surface of the electronic cooling element; and a third temperature-detecting element is mounted on the surface of the tube cooled by means of the electronic cooling element. A flow rate of the liquid passing through the tube is determined on the basis of a difference between a temperature detected by the third temperature-detecting element and a temperature detected by the second temperature-detecting element, while controlling the electronic cooling element so that a difference between a temperature detected by the first temperature-detecting element and the temperature detected by the second temperature-detecting element may amount to an appointed value. An open state of the valve is regulated by a signal from the flow meter to supply the liquid in an appointed flow rate.

BRIEF DESCRIPTION OF THE DRAWINGS

One preferred embodiment of the present invention is shown in the drawings, in which.

DESCRIPTION OF THE PREFERRED EMBODIMENT

Figure 1:
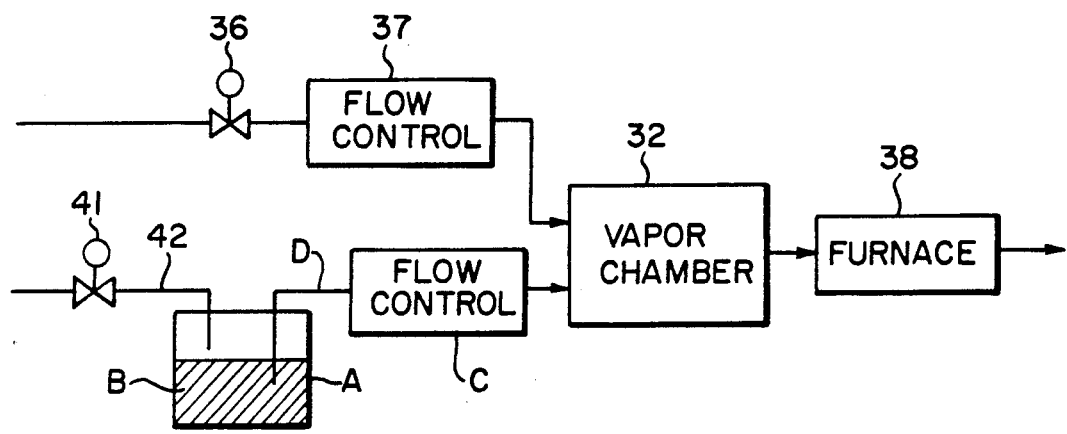
FIG. 1 is a diagram showing a flow of a liquid source sent out from a liquid tank.
Figure 2:
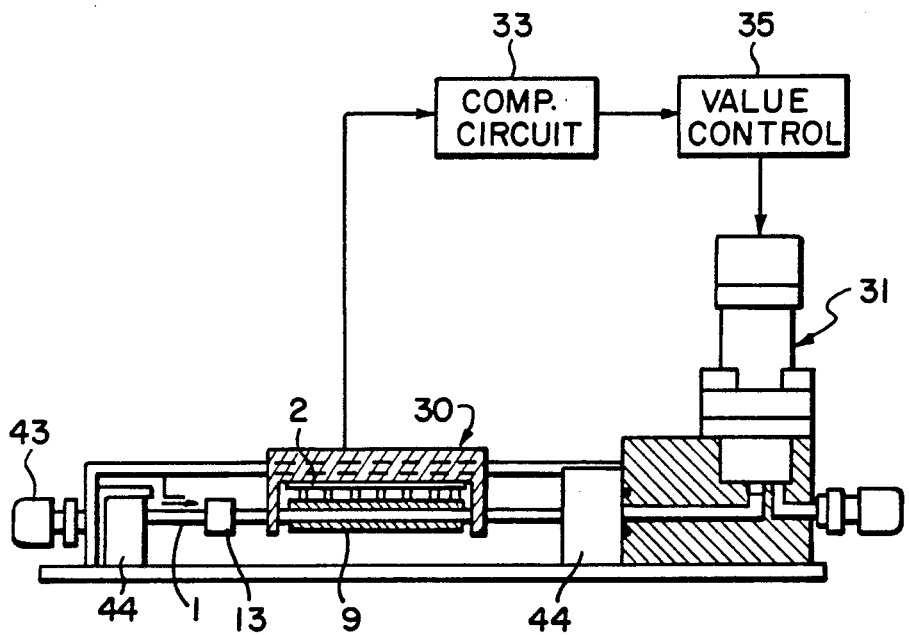
FIG. 2 is a partially sectioned front view showing principal parts of an apparatus for controlling a flow rate of a liquid.

The preferred embodiment of the present invention will be described below with reference to the drawings, in which:

FIG. 1 is a diagram showing a flow of a liquid source sent out from a liquid tank; and FIG. 2 is a partially sectioned front view showing principal parts of an apparatus for controlling a flow rate of a liquid.

Referring now to these drawings, A designates a liquid tank in which a liquid source B, such as tetraethoxysilane $Si(OC_2H_5)_4$ of alcoholate series for a coating material of a semiconductor element and silane tetrachloride SiCl4 for a raw material of optical fiber, is stored.

Means for sending out the liquid from the liquid tank A (for example, a valve 41 disposed in a gas supply pipe 42) is opened to pressurize an inside of the liquid tank A by an inert gas, such as nitrogen and argon. Thereby, a liquid such as the liquid source B to a liquid flow rate control portion C, which is disposed in a supply passage D, is sent out from the liquid tank A. In addition, a pump or a potential energy may be used for sending out this liquid.

Figure 3:
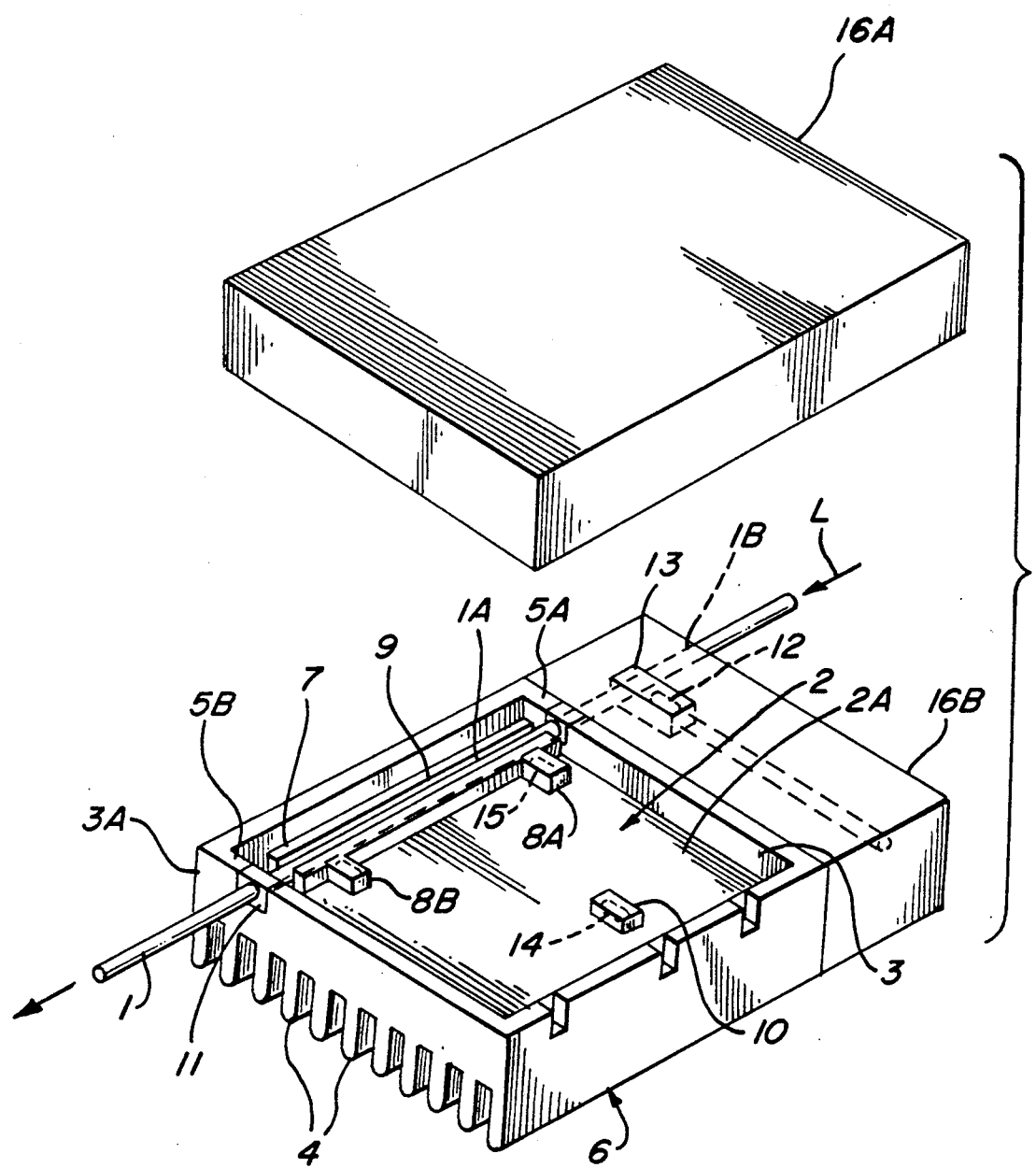
FIG. 3 is an exploded perspective view showing a flow meter.
Figure 4:
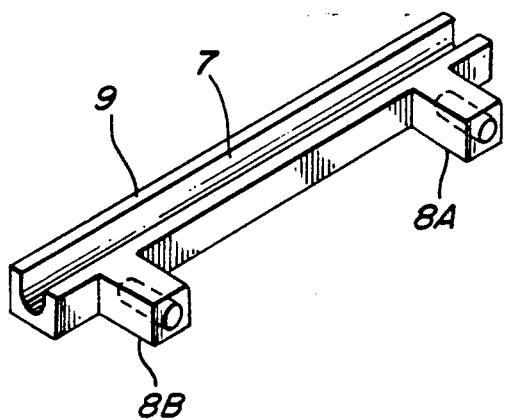
FIG. 4 is an enlarged perspective view showing the principal parts of a cooling element according to the invention.
Figure 5:
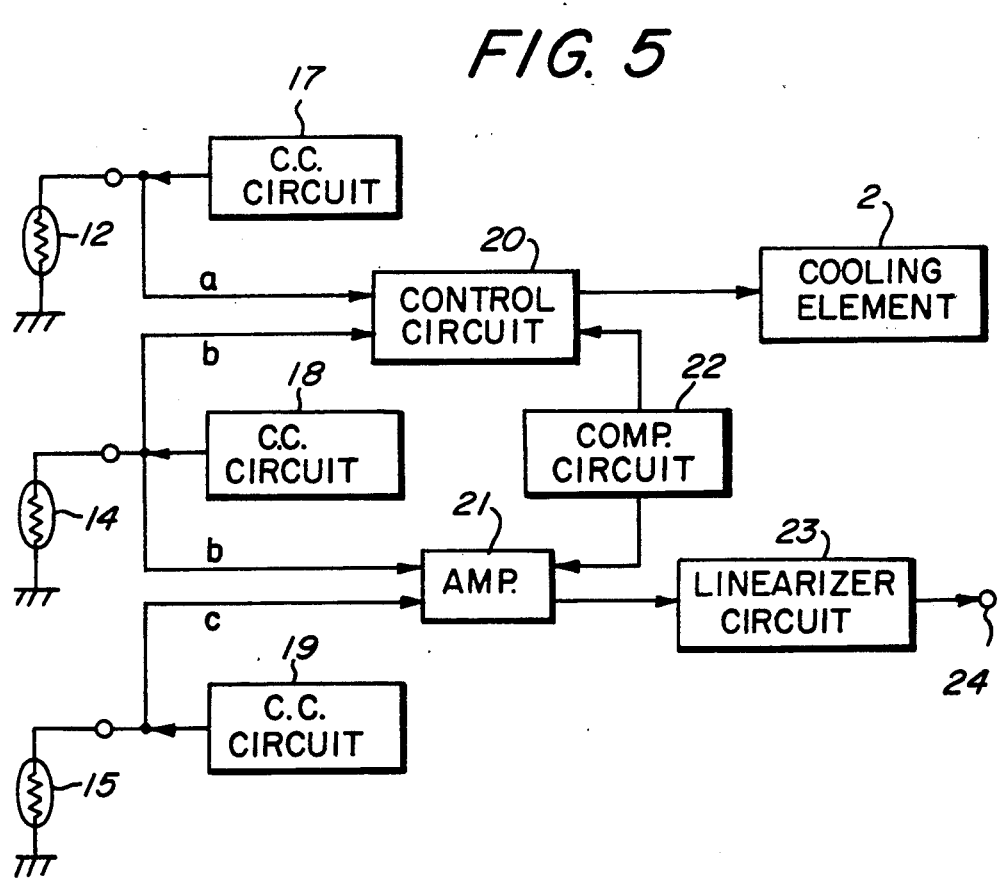
FIG. 5 is a diagram showing an electric system according to the invention.

The liquid flow rate control portion C is provided with a flow meter 30 and a valve 31 disposed on the downstream side of the flow meter 30, as shown in FIG. 2. The flow meter 30 is adapted as shown in FIGS. 3 to 5. For example, a tube 1 formed of stainless steel having an outside diameter of 2.0 mm and an inside diameter of 1.9 mm is supported by a pair of support blocks 44. The liquid from the liquid tank A flows through this tube 1 in the direction of an arrow L from a coupling 43 disposed at a left end of the tube 1.

Reference numeral 2 designates an electronic cooling element for cooling a part of the tube 1 and which is housed in a concave portion 3 of a heat sink 6 made of, for example, aluminum. The concave portion 3 is formed on one side thereof (upper side in the illustrated example). A large number of fins 4 are formed on the other side (lower side) thereof and opposite notched portions 5A, 5B formed on circumferential walls 3A surrounding the concave portion 3.

The electronic cooling element 2 is provided with a tube holder 9, which is provided with a groove 7 having a shape that matches an outside form of the tube 1, the groove 7 being formed on an upper surface thereof. Element holders 8A, 8B project from side portions of the holder 9. An element holder 10 is positioned at an appointed distance from the tube holder 9 and mounted on an upper surface 2A of the element 2, as shown in FIG. 4. These holders 9, 10 are formed of aluminum, copper or the like which are superior in heat conductivity and closely mounted on the upper surface 2A.

The tube 1 is closely mounted on the surface of the groove 7 and between the notched portions 5A, 5B and a portion 1A of the tube 1, which is engaged with the groove 7. The tube 1 is cooled by means of the electronic cooling element 2. In this case, a thermal compound is filled, or a silver paste is used, in a portion where the engaging portion 1A is brought into close contact with the groove 7 to achieve a close thermal bond between the portion 1A to be cooled and the electronic cooling element 2 and prevent an influence of vibration from occurring. Reference numeral 11 designates a thermal insulating material for filling up the gaps around the tube 1 in the notched portions 5A, 5B of the heat sink 6.

Reference numeral 12 designates a first temperature-detecting element for detecting a temperature of a non-cooled portion 1B on the upstream side of the portion 1A to be cooled. The element 12 is mounted on the surface of the tube through an element holder 13 formed of the same material as the holders 9, 10. Reference numeral 14 designates a second temperature-detecting element mounted on the element holder 10 for detecting a temperature of the electronic cooling element 2. Reference numeral 15 designates a third temperature-detecting element mounted on the element holder 8A on the upstream side of the tube holder 9 for detecting a temperature of the portion 1A to be cooled by means of the electronic cooling element 2. In addition, this third temperature-detecting element 15 may be mounted on the element holder 8B on the downstream side of the element holder 8A and in place of the element holder 8A.

Reference numerals 16A, 16B designate thermal insulating materials formed of, for example, a foamed polystyrene for covering the portion 1A to be cooled, the upper surface 2A of the electronic cooling element 2, and the first temperature-detecting element 12. In addition, these insulating materials 16A, 16B may be integrally formed. In addition, in FIG. 2 the insulating materials 16A, 16B are not shown.

FIG. 5 is a block diagram of an electric system including the above-described electronic cooling element 2 and the temperature-detecting elements 12, 14, 15. Referring to FIG. 5, reference numerals 17, 18, 19 designate constant-current circuits for constant-current controlling the temperature-detecting elements 12, 14, 15, respectively. Reference numeral 20 designates a constant-temperature control circuit for controlling the electronic cooling element 2 on the basis of a detected temperature "a" by the first temperature-detecting element 12 and a detected temperature "b" by the second temperature-detecting element 14. Thereby a difference $a-b$ between both detected temperatures can be controlled so that it may amount to an appointed value. Reference numeral 21 designates an amplifier for taking a difference between a detected temperature "c" by the third temperature-detecting element 15 and the detected temperature "b" by the second temperature-detecting element 14 and amplifying the same. Reference numeral 22 designates a temperature compensating circuit, reference numeral 23 designates a linearizer, and reference numeral 24 designates an output point.

In the flow meter having the above-described construction, an electric current having an appointed magnitude (for example, 0.3 $\mu$A) is passed through the respective temperature-detecting elements 12, 14, 15 by means of the respective constant-current circuits 17, 18, 19. The electronic cooling element 2 is controlled by means of, for example, a constant-temperature PID (Proportional Integral and Differential) control circuit 20 so that the difference $a-b$ between the detected temperature "a" by the first temperature-detecting element 12 and the detected temperature "b" by the second temperature-detecting element 14 may amount to an appointed value (for example, 8° C.).

Under this condition, if the fluid L is not flowing through the tube 1, the electronic cooling element 2 shows the same temperature all over the surface 2A. Thus, the detected temperature "c" by the third temperature-detecting element 15 is equal to the detected temperature "b" by the second temperature-detecting element 14; that is, $c-b$ amounts to zero. If the fluid L is flowing through the tube 1, the detected temperature "c" by the third temperature-detecting element 15 rises in proportion to the flow rate of the fluid L, so that a difference is brought about between the detected temperature "c" and the detected temperature "b." Accordingly, the flow rate of the fluid L flowing through the tube 1 can be determined by obtaining $c-b$ so that the above-described $a-b$ may amount to the appointed value.

The flow rate-output characteristics are determined by the construction and arrangement of the flow meter and the distance from the liquid inlet to the temperature-detecting element 15 in the portion 1A to be cooled. And, in the above described preferred embodiment, as to the measurement of very small flow rate, a more highly sensitive output can be obtained as the third temperature-detecting element 15 is disposed on the more upstream side of the portion 1A to be cooled. This third temperature-detecting element 15 can be positioned anywhere from a position on the upstream side (for example, at the element holder 8A) to a position on the downstream side (for example, at the element holder 8B). That is to say, the position of &he temperature-detecting element 15 is variously selected according to the measurement range. In addition, the temperature-detecting elements 15 may be disposed at the previously selected several points and any one of them may be selectively used according to the measurement range. In addition, a plurality of element holders may be used.

The present invention is not limited by the above-described preferred embodiment. For example, a linear thermistor, platinum thermometer, resistance thermometer element, coil, thermocouple and the like may be used as the temperature-detecting elements 12, 14, 15. In addition, the tube 1 may be formed of metallic materials, such as aluminum, copper, and nickel, in addition to stainless steel. In the case where a wall-thickness of the tube 1 is reduced, it may be formed of fluoroethylene resins, polymers and the like. In addition, the flow meter according to the present invention can also be used for the measurement of a flow rate of gases such as air, argon or corrosive gases.

A valve provided with a valve body-driving member comprising a piezostack as disclosed in, for example, Japanese Patent Laid-Open No. Sho 62-13884 can be used as the valve 31. As shown in FIG. 1 and illustrated in the Japanese Laid-Open Patent Sho No. 62-13884, a carrier gas from a valve 36 is subject to a flow controller 37 before introduction into a vaporizing chamber 32 to assist in introducing the liquid into a furnace 38.

A flow rate output signal from the flow meter 30 is compared with a preliminarily appointed set signal by means of a comparison control circuit 33 to send a signal to a valve-driving circuit 35 so that both these signals may coincide with each other and regulate the openness of the valve 31, whereby the liquid is sent to a vaporization chamber 32 at the appointed flow rate.

The vaporization chamber 32 is held at the appointed temperature or more so that the liquid sent through the liquid flow rate control portion C may be sufficiently vaporized. The liquid, for which flow rate is controlled by means of the liquid flow rate control portion C, is vaporized in the vaporization chamber 32.

A switching valve 36 for a carrier gas is opened to send the carrier gas, such as nitrogen, argon, hydrogen, and oxygen, controlled by means of a gas flow rate control apparatus 37 (for example, a mass flow controller disclosed in Japanese Patent Laid-Open No. Sho 62-13884) to the vaporization chamber 32, and the above-described vaporized liquid source is sent out to, for example, a reaction furnace 38 by this carrier gas.

As above-described, according to the present preferred embodiment, the liquid source is controlled in flow rate under the liquid condition and vaporized, so that a comparatively large flow rate of gas converted into a gas flow rate can be stably supplied.

According to the present invention, not only can the flow rate of the liquid flowing through the tube be determined in a noncontacting manner and the very small flow rate of the liquid determined, but also the tube is cooled by means of the electronic cooling element so that no bubbles are generated, and thus the measurement of the liquid, which is apt to generate gases, such as low boiling point liquid, is possible. In addition, the measurement is not influenced by the gases dissolved in the liquid, and merely the temperature difference resulting from the flow of the fluid, that is, the rise of the temperature of the fluid, is detected to prevent the measurement from being influenced by the installing posture of the flow meter, so that a highly accurate measurement is possible. Consequently, stable and sure controlling flow rate of liquid is possible.

What is claimed is:

1. A flow meter for measuring fluid flow, comprising:
   a conduit adapted to be connected to a source of fluid and permitting fluid to pass therethrough;
   means for cooling a portion of the conduit;
   a first temperature sensor mounted on a surface of the conduit upstream of the cooling means for providing a signal representative of temperature;
   a second temperature sensor mounted on the cooling means for providing a signal representative of temperature;
   a third temperature sensor mounted on a surface of the conduit downstream of the cooling means for providing a signal representative of temperature;
   means for controlling the cooling means so that a temperature difference between the first temperature sensor and the second temperature sensor is maintained at a predetermined value, and
   means for determining flow rate whereby the flow rate of the fluid is determined on the basis of a difference between the temperature signals of the second temperature sensor and the third temperature sensor.

2. The flow meter according to claim 1 wherein the cooling means includes a tube holder having a groove therein for holding the conduit.

3. The flow meter according to claim 1 further comprising means for controlling a current flow to each temperature sensor to a constant value.

4. The flow meter according to claim 2 wherein the cooling means further comprises a plurality of fins on one side thereof and a concave portion on an opposite side thereof, said concave portion receiving the conduit.

5. A flow meter for measuring fluid flow, comprising:
   a conduit adapted to be connected to a source of fluid, whereby fluid can flow through the conduit and heat can be exchanged between the fluid and the conduit;
   means for cooling the conduit including a holder having a plurality of fins on one side thereof and a concave portion on an opposite side thereof, said concave portion receiving the conduit;
   a first temperature-detecting element mounted on the conduit upstream of the cooling means;
   a second temperature-detecting element connected to the cooling means;
   a third temperature-detecting element mounted on the conduit at a position downstream of the first temperature-detecting element at a location where the conduit has been cooled, and
   means for determining a flow rate of the liquid based on output signals from the respective temperature-detecting elements.

6. The flow meter according to claim 5 further comprising means for controlling a current flow to each temperature sensor to a constant value.

* * * * *